United States Patent Office 2,776,915
Patented Jan. 8, 1957

2,776,915

METHOD OF PROVIDING SILVER LAYERS

Gerard Willem van Oosterhout and Arie Bol, Eindhoven, Netherlands, assignors to Hartford National Bank and Trust Company, Hartford, Conn., as trustee No Drawing. Application August 28, 1953, Serial No. 377,224

Claims priority, application Netherlands October 6, 1952

3 Claims. (Cl. 117—212)

This invention relates to methods of providing layers of silver for obtaining an electrically conducting coating or decorative effects on articles.

To this end a great many of organic silver salts, inter alia silver acetate, have been proposed, which, after applying them in the form of a suspension or a solution, can be converted into silver by heating at temperatures between 400° C. and 900° C.

Again it has been suggested to use silver lactate or silver butyrate in the form of a suspension or a solution for the aforesaid purpose. Owing to the low decomposition temperature of said materials they permit of obtaining silver layers by heating at temperatures of from 150° C. to 500° C. A further advantage of said materials is that their melting point is slightly lower than the decomposition temperature, thus enabling the silver salt, which melts first on heating, to penetrate into unevennesses of the surface to which it is applied, and consequently promoting its adherence.

Said known methods suffer from a limitation in that the required suspensions and solutions do not keep well even when using very pure raw materials. A further limitation is that the layers applied decompose first at the outside on heating, hence any silver salt still present decomposes underneath the silver formed, thus producing gaseous decomposition products. This permits only thin layers of silver salt to be decomposed for obtaining well adhering, uniform silver layers, it being necessary to repeat the treatment several times in order to obtain a sufficiently thick layer.

According to the invention said limitations are mitigated by using silver lactate or silver butyrate in solid form for the purpose of applying the silver layer.

To this end, an article to be provided with a silver layer is heated, at least where the layer is to be provided at a temperature above approximately 150° C., and brought into contact with solid silver lactate or silver butyrate. Should complete decomposition to silver not be obtained on melting, it is advisable to heat for some time after applying the layer.

The silver salt is preferably used in the form of a rod, for example made by moulding, which permits conductive layers or decorations to be readily provided at the desired areas.

For example, a glass article is heated at a temperature of 200° C. and rubbed with a rod of silver lactate where the silver layer is to be provided, the silver lactate melting at the surface and decomposing substantially. After which heating at approximately 300° C. yields a firmly adhering, electrically conductive silver layer.

In this manner it is possible to provide silver layers on materials such as ceramics, glass and—inasmuch as the softening temperature and decomposition temperature are sufficiently high—also on plastics.

For example, the method according to the invention may be used for the manufacture of capacitors. Moreover, resistors, more particularly ceramic resistors of semiconductive material, can thus be provided with suitable contacts. Furthermore, the method permits of providing decorations on said materials.

One advantage accruing from the invention is that the silver lactate and silver butyrate in the solid form keep better than in the form of suspensions. Furthermore, there is no need of using very pure materials. Great importance is to be attached to the fact that it permits of obtaining firmly adhering relatively thick silver layers in one operation, which results from the fact that, in carrying out the invention, the first silver is produced direct at the surface of the articles, and the silver layer builds up outwardly, thus avoiding, in contradistinction to known methods, the formation of detrimental quantities of gaseous decomposition products underneath the silver.

What is claimed is:

1. A method of applying a layer of silver to an object comprising the steps, heating said object to a temperature of about 150° C. to 300° C., and applying to selected surface portions of said object only a silver salt of a fatty acid selected from the group consisting of lactic and butyric acid while said object is maintained at said temperature to form a conductive silver layer at those surface portions.

2. A method of applying a layer of silver to an object as claimed in claim 1 in which the heating is continued after the silver salt is applied to fully convert the same to silver.

3. A method as claimed in claim 1, in which the silver salt is applied in solid form.

References Cited in the file of this patent

UNITED STATES PATENTS

| | | |
|---|---|---|
| 1,157,569 | Moench | Oct. 19, 1915 |
| 1,922,387 | Muller | Aug. 15, 1933 |
| 2,293,822 | Haven | Aug. 25, 1942 |